(12) United States Patent
Rice et al.

(10) Patent No.: US 6,561,309 B1
(45) Date of Patent: May 13, 2003

(54) GAS FLOW GENERATOR AND APPARATUS FOR USING THE SAME

(75) Inventors: Eric E. Rice, Middleton, WI (US); Robert J. Gustafson, Lake Mills, WI (US)

(73) Assignee: Orbital Technologies Corporation, Madison, WI (US)

( * ) Notice: Subject to any disclaimer, the term of this patent is extended or adjusted under 35 U.S.C. 154(b) by 0 days.

(21) Appl. No.: 09/644,001

(22) Filed: Aug. 22, 2000

(51) Int. Cl.[7] ............................................. G10K 11/00
(52) U.S. Cl. ...................................... 181/0.5; 73/570.5
(58) Field of Search ....................... 181/0.5, 143, 144, 181/145, 152, 153, 159, 191, 196, 155; 381/338, 339, 340, 350, 161, 165; 73/570.5

(56) References Cited

U.S. PATENT DOCUMENTS

| | | | | |
|---|---|---|---|---|
| 3,584,160 A | * | 6/1971 | Janssen | 181/157 |
| 4,218,921 A | * | 8/1980 | Oran et al. | 181/0.5 |
| 4,382,245 A | * | 5/1983 | Harrigan | 181/0.5 |
| 4,402,221 A | * | 9/1983 | Lee et al. | 181/0.5 |
| 4,447,251 A |   | 5/1984 | Dunn et al. | |
| 4,718,517 A | * | 1/1988 | Carlson | 181/159 |
| 4,962,330 A | * | 10/1990 | Lierke et al. | 181/0.5 |
| 5,036,944 A | * | 8/1991 | Danley et al. | 181/0.5 |
| 5,117,463 A | * | 5/1992 | Oyaba et al. | 181/159 |
| 5,313,525 A | * | 5/1994 | Klasco | 181/156 |
| 5,500,493 A | * | 3/1996 | Guigne et al. | 181/0.5 |
| 5,525,041 A | * | 6/1996 | Deak | 417/322 |
| 5,712,452 A | * | 1/1998 | Lin | 181/0.5 |
| 6,055,320 A | * | 4/2000 | Wiener et al. | 181/152 |

FOREIGN PATENT DOCUMENTS

| | | | | |
|---|---|---|---|---|
| JP | 05253470 A | * | 10/1993 | ............ B01J/19/00 |

* cited by examiner

Primary Examiner—Robert E. Nappi
Assistant Examiner—Edgardo San Martin
(74) Attorney, Agent, or Firm—Dorsey & Whitney LLP

(57) ABSTRACT

A gas flow generator for use in a position control apparatus having an oscillating motion driver, a chamber having a side wall extending outwardly from the oscillatory motion generating surface of the driver, a distal end wall spaced from the driver and joined with the side wall, and one or more gas flow orifices provided in the end wall.

22 Claims, 4 Drawing Sheets

GAS FLOW GENERATOR AND APPARATUS FOR USING THE SAME

BACKGROUND OF THE INVENTION

1. Field of the Invention

The present invention relates generally to a gas flow generator and an apparatus for using the same and more particularly to a gas flow generator commonly referred to as a sonic pump or sonic pump position control apparatus.

2. Description of the Prior Art

So called sonic pumps or sonic pump position control apparatus currently exist for the purpose of levitating or controlling the position or movement of objects, particularly in a low or zero gravity condition. Such sonic pump position control apparatus generally include a means commonly in the form of a transducer device such as an audio loudspeaker which converts electrical energy into mechanical energy or other gas momentum and a means for transmitting such gas momentum to the object to be controlled. One example of a sonic pump levitation apparatus is shown in U.S. Pat. No. 4,447,251 issued to Dunn et al. disclosing a gas flow generator having an elongated duct and a collimated hole structure at the distal end of the duct for transmitting an oscillatory gas flow to a levitated object. Other structures such as cone shaped or ellipsoidally-shaped acoustical chambers with a single oscillatory motion transmission opening also exist. In some embodiments, the size of the single opening is variable.

A drawback of some prior art gas flow generators and sonic pump levitation or position control apparatus is that they fail to provide means for creating a flow field of desired dimension and desired flow properties. Accordingly, there is a need in the art for an improved gas flow generator design capable of creating a flow field of desired dimensions and flow properties and an apparatus for using such generator to control the position or movement of an object.

SUMMARY OF THE INVENTION

The present invention relates to an improved gas flow generator capable of creating a flow field of desired dimension and flow properties and a position control apparatus or the like embodying such gas flow generator.

In general, the gas flow generator of the present invention includes an oscillatory motion driver such as an audio speaker and a cover defining a chamber with at least one gas flow orifice in a distal end wall of the chamber. More specifically, the cover includes a side wall which extends generally outwardly from the oscillatory motion transmitting side of the driver and a distal end wall. In a preferred embodiment, the side wall defines a generally cylindrical configuration and one or more gas flow orifices are provided in the distal end wall.

In further embodiments, the end wall can assume a variety of configurations, depending upon the flow field which is desired to be created. In one embodiment a plurality of gas flow orifices are provided in a generally planar end wall. In a most preferred embodiment, a plurality of orifices are provided in an end wall having a partial spherical configuration. The plurality of orifices enables the generator to create a flow field of relatively large dimensions.

The invention also relates to a position control apparatus embodying the above-described gas flow generator. Specifically, the position control apparatus in accordance with a preferred embodiment includes a position control chamber having an outer wall and one or more gas flow generators mounted adjacent to the outer wall in which each of the gas flow generators includes an oscillatory motion driver and an acoustical or air flow chamber associated therewith. Such chamber is in communication with the oscillatory motion driver and includes at least one orifice in communication with the position control chamber. In a most preferred embodiment, the position control apparatus includes a generally spherical position control chamber surrounded by a plurality, preferably six, gas flow generators. Each of these generators includes a plurality of gas flow orifices which direct gas flow inwardly toward the center of the position control chamber to control the position of an object within such chamber.

Accordingly, an object of the present invention is to provide an improved gas flow generator.

Another object of the present invention is to provide an improved gas flow generator having a chamber in communication with the oscillatory motion driver with a plurality of gas flow orifices for creating a flow field.

Another object of the present invention is to provide a gas flow generator for creating a flow field with a variety of configurations and flow characteristics.

A further object of the present invention is to provide an improved position control apparatus.

A still further object of the present invention is to provide a position control apparatus with a generally spherical position control chamber and a plurality of gas flow generators positioned on the periphery of the spherical chamber.

These and other objects of the present invention will become apparent with reference to the drawings, the description of the preferred embodiment and the appended claims.

DESCRIPTION OF THE PREFERRED EMBODIMENT

The subject matter of the present invention relates to a gas flow generator to produce controlled flows of gas via an oscillatory motion generator. These gas flows may be used to control the position and acceleration of an object such as but not limited to a spherical fluid or solid sample without direct contact. Such control would be provided in a position control apparatus comprising at least one and preferably two or more of the gas flow generators. The operation and control of the gas flow generators and thus the position control apparatus may be provided by a fuzzy logic controller or any other control means which is designed to receive information necessary to calculate output commands to the gas flow generators. The gas flow generators in turn produce an instantaneous flow of gas that is proportional to the power level of the input signal. During operation, the gas flows against the object whose position is to be controlled and influences its acceleration, velocity and position via aerodynamic drag. Although the position control apparatus of the present invention can be used in various gravitational environments, its primary intended use is in a zero or low gravitational environment such as in space.

Figure 1A:
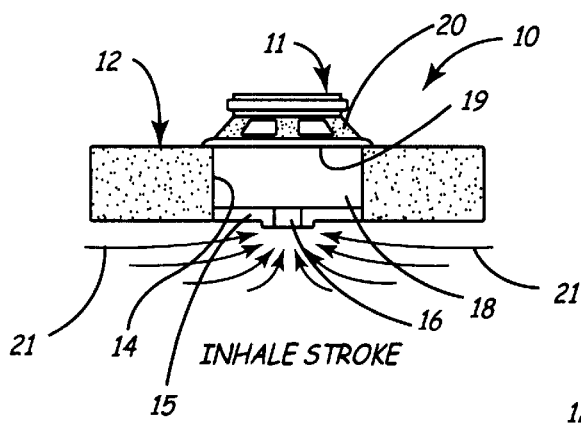
FIG. 1 comprised of FIGS. 1A, 1B and 1C are schematic sectional views of a focused (single orifice) gas flow generator with FIG. 1A showing the generator and air flow during the inhale stroke, FIG. 1B showing the generator and air flow during the exhale stroke and FIG. 1C showing the generator and air flow during steady state operation.
Figure 1B:
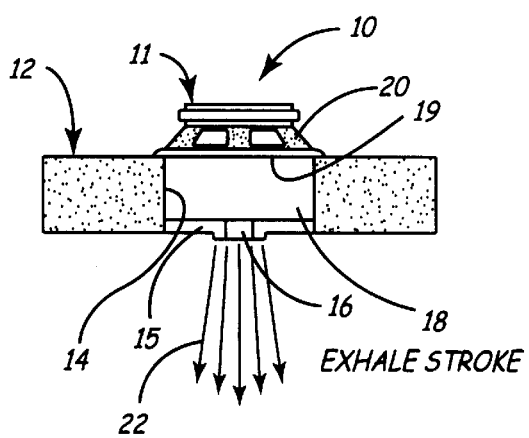
Figure 1C:
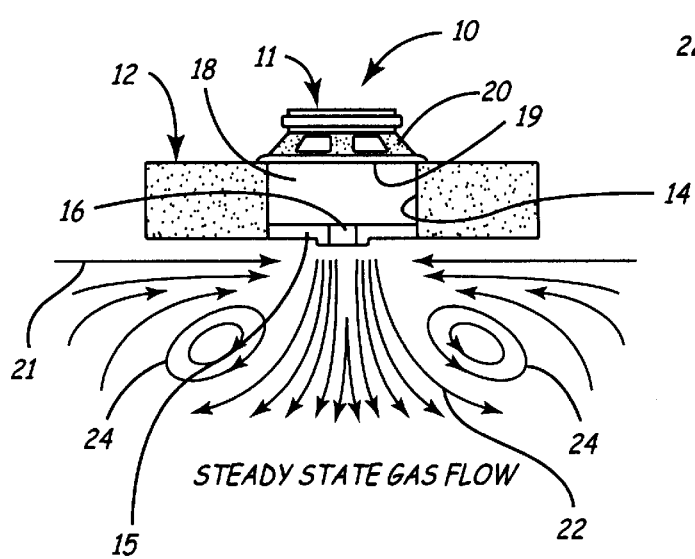
Figure 3A:
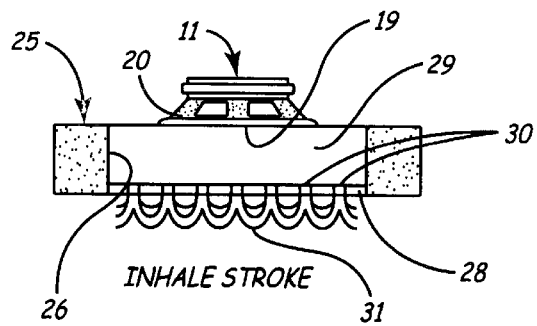
FIG. 3 comprised of FIGS. 3A, 3B and 3C are schematic sectional views of a diffuse (multiple orifice) linear gas flow generator with FIG. 3A showing the generator and air flow during the inhale stroke, FIG. 3B showing the generator and air flow during the exhale stroke and FIG. 3C showing generator and air flow during steady state operation.
Figure 3B:
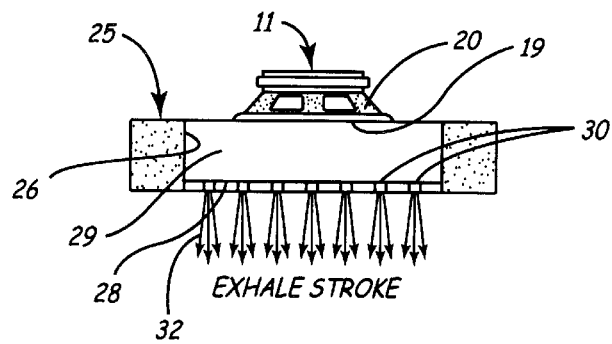
Figure 3C:
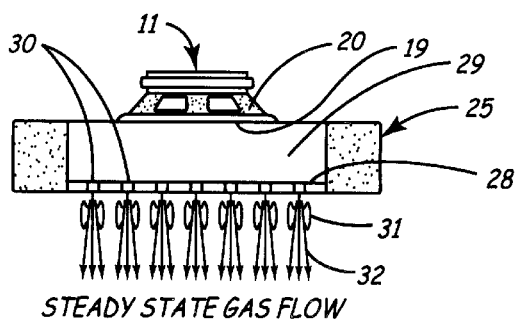

The basic structure of the gas flow generator in accordance with the present invention is illustrated in FIG. 1, comprised of FIGS. 1A, 1B and 1C, as a focused gas flow generator and in FIG. 3, comprised of FIGS. 3A, 3B and 3C, as a diff use gas flow generator.

Figure 2:
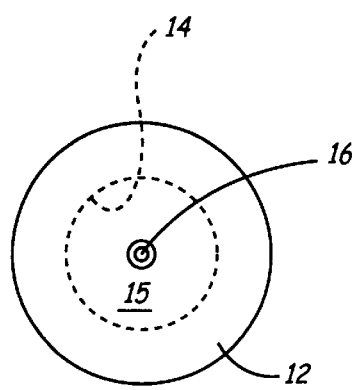
FIG. 2 is an elevational top view of the air flow generator of FIG. 1.

Reference is first made to FIGS. 1 and 2 disclosing a focused gas flow generator 10. The generator 10 includes an oscillatory motion driver 11 and a cover 12 defining a chamber 18 adjacent to the driver 11. The driver 11 of the preferred embodiment includes a diaphragm 19 of an audio speaker 20. The diaphragm 19 is driven by a variable frequency wave. The frequency of such wave may vary from –1000 Hz, but preferably is in the 20 to 200 Hz frequency range. The driver 11 functions to create sound energy or oscillatory motion in the diaphragm 19 which in turn emits oscillatory gas waves from its surface.

The cover 12 includes an inner side wall 14 extending outwardly from the surface of the diaphragm 19 of the driver 11 and a distal end wall 15 joining the side wall 14 and spaced outwardly from the diaphragm 19. In the embodiment of FIG. 1, the end wall 15 is provided with a single gas flow orifice 16 located substantially in the center of the end wall 15. Although the preferred embodiment shows the single orifice 16 to be of a fixed size, means can also be provided for varying the cross-sectional size and configuration of the orifice 16, thereby correspondingly varying the velocity and the distribution width of the air flow passing through the orifice 16.

The side wall 14 of the cover 12 together with the end wall 15 define the chamber 18 adjacent to the diaphragm 19. While the preferred configuration of the side wall 14 defines a cylinder as shown best in FIG. 2, and thus a cylindrical chamber 18, it is contemplated that the features of the present invention could be achieved with other configurations as well. In the embodiment of FIG. 1, the end wall 15 is positioned at substantially right angles to the side wall 14 and the single orifice 16 is significantly smaller than the size of the end wall 15.

During operation, as the speaker diaphragm 19 oscillates or extends and retracts, gas moves through the chamber 18 to the orifice 16 resulting in the passage of air flow into and out of the chamber 18 through the gas flow orifice 16. As shown in FIG. 1A, as the diaphragm 19 retracts during the inhale stroke, gas from the area outside the chamber 18 and surrounding the orifice 16 is drawn into the chamber 18 through the orifice 16 generally along the flow lines 21. As the diaphragm 19 extends during the exhale stroke, air from within the acoustical chamber 18 flows out through the orifice 16 generally along the air flow lines 22. During steady state gas flow as shown in FIG. 1C, standing vortices 24 are created near the orifice 16. These function to keep the directed outflow 22 near a substantially steady state condition as shown in FIG. 1C.

The air flow created by the oscillating diaphragm 19 of the driver 11 generates a relatively gas diffuse flow field of relatively low velocity within the chamber 18, but gas flowing out through the orifice 16 provides a narrow, coherent flow field of relatively high velocity as shown in FIGS. 1A, 1B and 1C.

If the size of the orifice 16 is made to be variable, such as with a iris mechanism or the like, this particular embodiment of a gas flow generator provides a very efficient mechanism for changing the velocity and distribution of the gas flow, thereby creating a fast response, directed gas flow from electrical energy using only the atmosphere existing in the chamber 18.

Reference is next made to FIGS. 3, comprising FIGS. 3A, 3B and 3C, and 4 showing a diffuse gas flow generator in accordance with the present invention. Similar to the focused gas flow generator of FIGS. 1 and 2, the diffuse gas flow generator includes an oscillatory motion driver 11 with a diaphragm 19 and a cover 25. The cover 25, like the cover 12 of FIG. 1, includes an inner side wall 26 and a distal end wall 28. As shown, the side wall 26 extends outwardly from the surface of the diaphragm at substantially right angles and the end wall 28 is spaced from the surface of the diaphragm and is connected with the outer ends of the wall 26. Together, the side wall 26 and the end wall 28 define the chamber 29.

Figure 4:
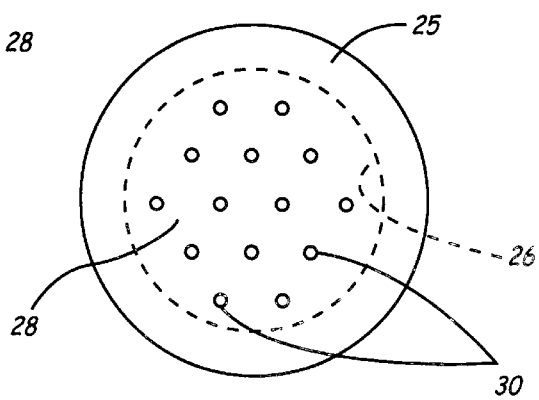
FIG. 4 is an elevational top view of the air flow generator of FIG. 3.

As shown in FIG. 4, the cover 25, and thus the inner side wall 26, defines a generally cylindrically shaped chamber 29, however, other configurations may be utilized without deviating from the invention. Further, as shown in FIG. 3, the cross-sectional dimension of the cover 25 is greater than that of the diaphragm 19. This cross-sectional dimension could, however, be equal to or less than the dimension of the diaphragm 19. As shown in FIG. 1, the cross-sectional dimension of the cover 12 is approximately equal to that of the diaphragm 19.

In the diffuse gas flow generator of FIGS. 3 and 4, the end wall 28 is provided with a plurality of orifices 30. Although the orifices 30 may be of variable size and distribution mode to create the desired gas flow velocity distribution, in the structure shown, the orifices 30 are of the same size and are substantially uniformly distributed over the end wall 28 as shown in FIG. 4.

During operation, as the speaker diaphragm 19 of FIG. 3 extends and retracts, gas moves through the chamber 29 to the orifices. 30 resulting in gas flow into and out of the chamber 29 through the gas flow orifices 30. As shown in FIG. 3A, during the inhale stroke in which the diaphragm 19 is retracting, gas from outside the chamber 29 is drawn into the chamber 29 through the orifices 30 along the flow lines 31. During the exhale stroke as shown in FIG. 3B when the diaphragm 19 extends, gas from within the chamber 29 is forced out through the orifices 30 along the flow lines 32. During steady state conditions as shown in FIG. 3C, the prevailing gas flow is outwardly through the orifices 30 in a generally directed flow as shown. With a plurality of orifices as shown in the embodiment of FIGS. 3 and 4, a relatively wide flow field is produced across the outer surface of the end wall 28.

Figure 5:
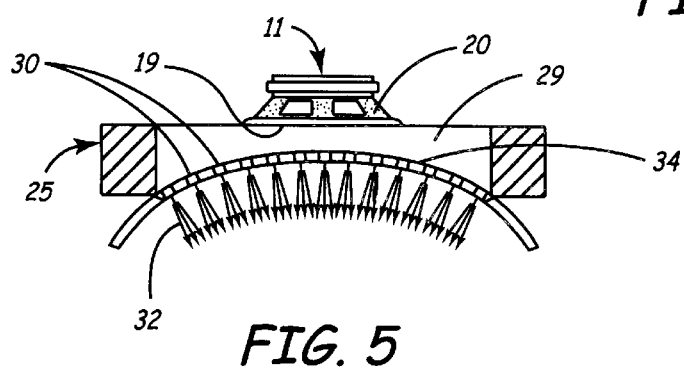
FIG. 5 is a schematic sectional view of an alternate embodiment of a diffuse gas flow generator for creating a partial spherical flow field.

FIG. 5 shows a further embodiment of a gas flow generator in accordance with the present invention. The embodiment of FIG. 5 is similar to that shown in FIGS. 3 and 4 except that the distal end wall 34 of FIG. 5 is not flat or planar as shown in FIG. 3, but is instead generally spherical. In other words, the configuration of the end wall 30 forms a portion of a spherical surface. With this configuration, the generator produces a substantially uniform gas flow velocity that is directed through the orifices in the end wall 34 toward the center of the sphere. This particular embodiment has special applicability to a levitation apparatus such as that described below with reference to FIGS. 6–8. In general, the focused gas flow generator of FIGS. 1 and 2 produces a gas flow of a diameter which is limited by the diameter of the single orifice 16, while the diffuse gas flow generators of FIGS. 3, 4 and 5 produce a much larger gas flow area than the single orifice, focused embodiment. This larger flow field allows the position control forces to be distributed over a much larger area resulting in much less distortion of the fluid sample or other object being position controlled. Further, the flow field from the spherical diffuse generators such as is shown in FIG. 5, helps distribute a substantially uniform aerodynamic pressure across the surface of large fluid or other levitation samples. Further, the larger flow field allows an increased zone of control relative to that possible with a focused generator.

Figure 6:
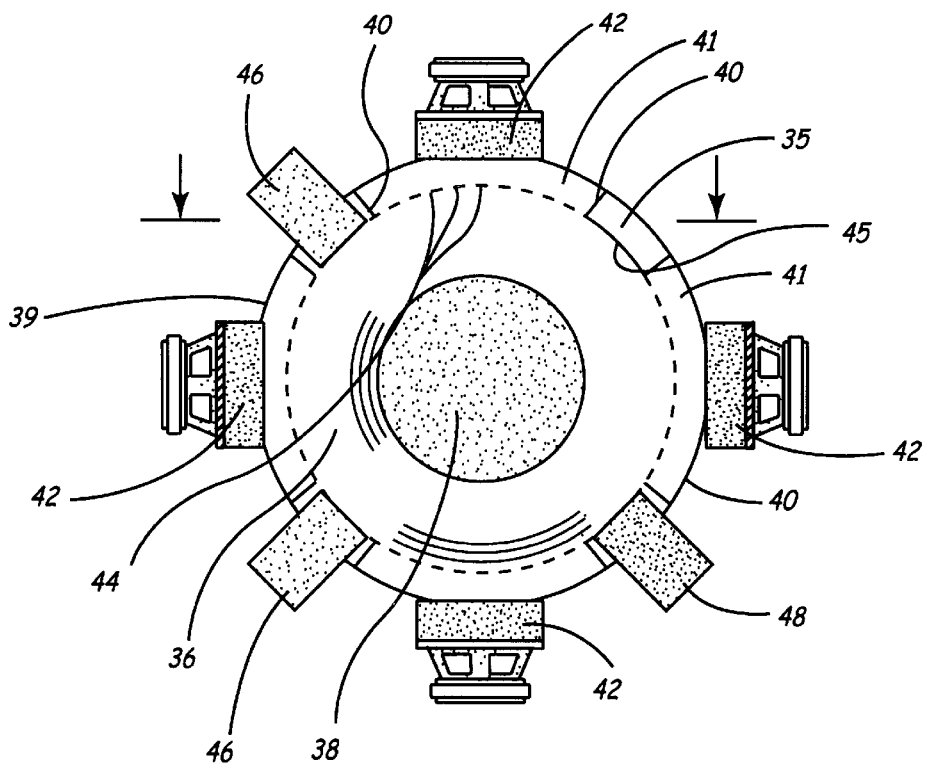
FIG. 6 is a sectional view of a position control apparatus embodying multiple gas flow generators.

FIG. 6 illustrates a schematic sectional view of a position control apparatus incorporating a plurality of the gas flow generators 42 of the type described above. In particular, the gas flow generators in the position control apparatus of FIG. 6 are similar to those of FIG. 5. The apparatus of FIG. 6 includes a generally spherical wall 35 defining a spherical position control or levitation chamber 36. Contained within the chamber 36 is a fluid sample 38 or other object to be levitated or controlled. Although the preferred embodiment shows the inner shell 35 to be spherical, it could, if desired, assume other configurations for various applications.

The apparatus also includes an outer spherical wall or shell 39 spaced radially outwardly from the spherical inner shell 35. Positioned between the inner 35 and outer 39 spherical shells are a plurality of walls 40. These walls 40 are generally perpendicular to the shells 35 and 39 and function to support the inner and outer shells 35 and 39 in a generally structurally rigid position relative to one another. The walls 40, together with the portions of the inner shell 35, also function to define the chambers 41 for the plurality of gas flow generators 42. As shown, the apparatus includes a plurality of the gas flow generators 42 positioned circumferentially around the outer shell 39. While the sectional view of FIG. 6 shows four such generators, the apparatus includes a total of six such generators. Specifically, these six diffuse flow generators 42 are mounted in inwardly opposing pairs on each of three orthogonal axes.

Figure 7:
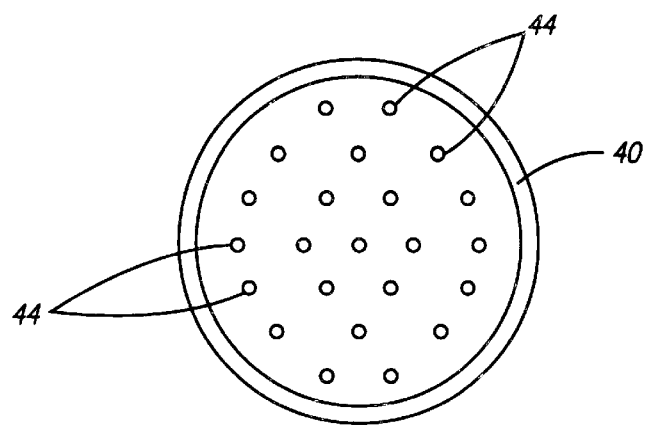
FIG. 7 is a sectional view of a portion of the position control apparatus of FIG. 6 as viewed along the section line 7—7 of FIG. 6.

In the embodiment of FIG. 6, the walls 40 for each of the generators 42 has a generally circular cross-sectional configuration as shown best in FIG. 7. The portions of the inner shell 35 within the walls 40 of a particular generator 42 are provided with a plurality of orifices 44, similar to the structure of FIG. 5. The portions 45 of the shell 35 between the walls 40 of adjacent gas flow generators 42 are a solid wall without orifices.

A plurality of position sensors 46 and a high resolution video camera 48 are provided on the outer periphery of the apparatus as shown in FIG. 6. These elements are mounted to the inner sphere 35 and extend outwardly through the outer sphere 39 in the areas between the chambers 41 of the gas generators 42. With this structure an object to be levitated or controlled, such as a fluid or solid sample 38, can be captured in the chamber 36 where a surface oscillation or wave on a fluid sample can be induced by one or more of the gas flow generators 42. If the fluid sample 38 or other object drifts outside of the defined control zone within the chamber 36, appropriate ones of the gas flow generators 42 can be activated or adjusted to gently push the sample 38 back to the center or desired control zone.

When in use, the apparatus of FIG. 6 is controlled by a control device which is provided with position information regarding the sample 38 from the position sensors 46. The controller is able to calculate output commands to the various gas flow generators 42 to control the position of the object 38. A variety of controllers may be utilized for this purpose such as fuzzy logic controllers, among others. The generators 42 produce an instantaneous flow of gas that is proportional to the power level of the input signal. The gas flow from the generators 42 flows against the object 38 and influences its acceleration, velocity and position via aerodynamic drag. Such a system is capable of effectively isolating the levitated object 38 from g-jitter of a space flight vehicle and other unwanted acceleration sources to facilitate experiments or for other uses.

Figure 8:
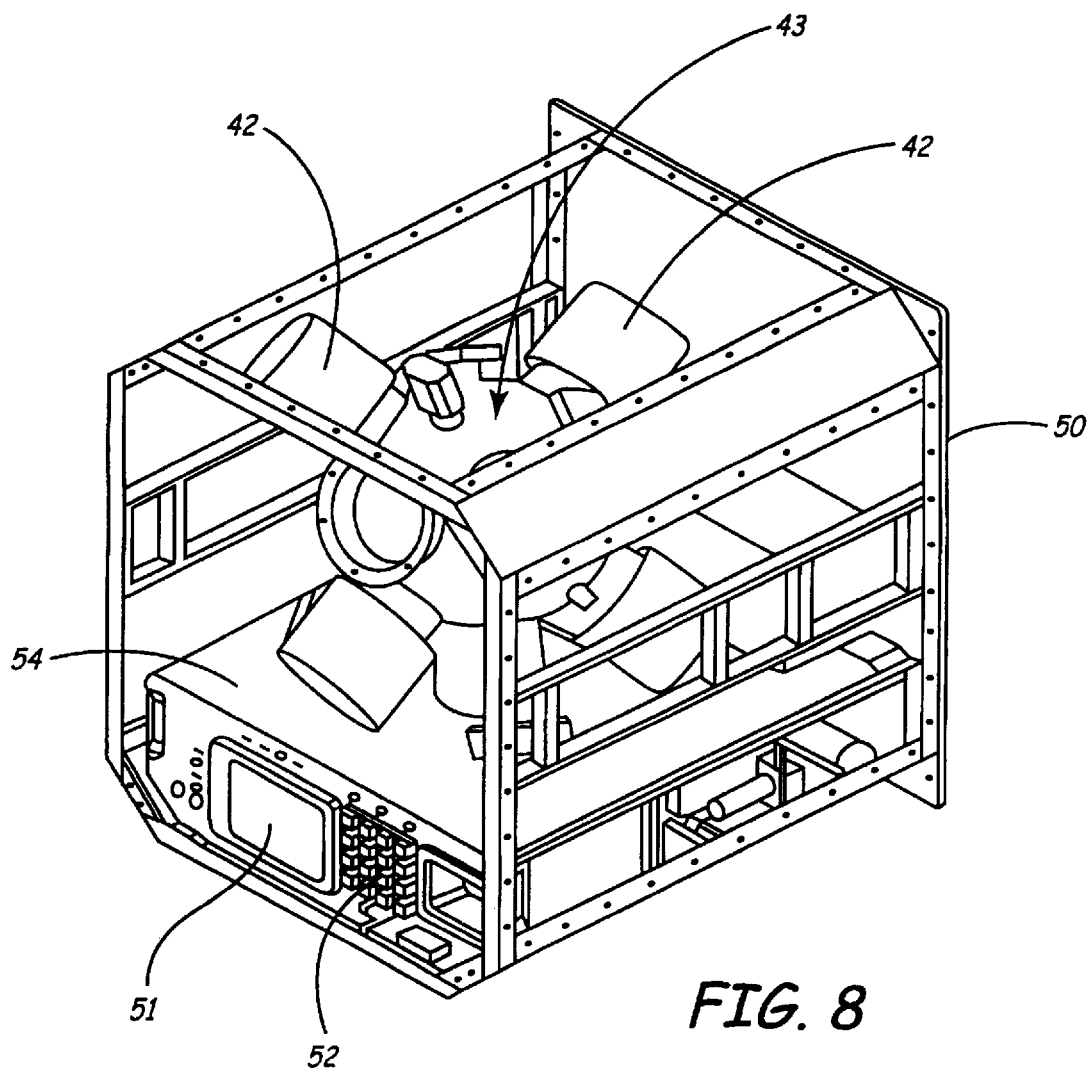
FIG. 8 is an, isometric view of an assembled position control apparatus of the type shown in FIG. 6 and associated structure.

FIG. 8 is a space flight configuration incorporating the position control apparatus of FIG. 6. Specifically, the structure of FIG. 8 includes a frame 50 to which the apparatus 43 of FIG. 6 is mounted. Also mounted to the frame is a control element 54 having a display screen 51, input means and various other means to define and control the position and/or movement of the object within the apparatus 43.

The gas flow generator and position control apparatus of the present invention has application to all environments in which levitation or position control of an object is possible or desired, but has particular applicability to environments of low or zero gravity.

Although the description of the preferred embodiment has been quite specific, it is contemplated that various modifications could be made without deviating from the spirit of the present invention. Accordingly, it is intended that the scope of the present invention be dictated by the appended claims rather than by the description of the preferred embodiment.

What is claimed is:

1. A gas flow generator comprising:
   an oscillatory motion driver having a diaphragm;
   a cover defining a chamber mounted adjacent to said driver, said chamber having a side wall extending generally outwardly from said driver and an end wall joining said side wall and spaced outwardly from said driver, said chamber having a cross-sectional area as measured in a plane parallel to said diaphragm which cross-sectional area is about equal to or greater than that of said diaphragm; and
   at least one gas flow orifice in said end wall.

2. The gas flow generator of claim 1 including a plurality of orifices in said end wall.

3. The gas flow generator of claim 1 wherein said side wall defines a generally cylindrical configuration.

4. The gas flow generator of claim 3 wherein said end wall is positioned at generally right angles relative to said side wall.

5. The gas flow generator of claim 1 wherein said end wall has a partial spherical configuration.

6. The gas flow generator of claim 5 including a plurality of orifices in said end wall.

7. The gas flow generator of claim 6 wherein said plurality of orifices are laterally spaced from one another throughout said end wall.

8. The gas flow generator of claim 7 wherein said orifices have a generally circular cross-sectional configuration.

9. A position control apparatus comprising:

a position control chamber having an outer wall and two or more gas flow generators mounted adjacent to said outer wall wherein each of said gas flow generators includes an oscillatory motion driver having a diaphragm and a gas flow chamber associated therewith, said gas flow chamber having a side wall extending outwardly from said driver, at least one orifice in communication with said position control chamber and a cross-sectional area as measured by a plane parallel to said diaphragm which is at least equal to that of said diaphragm.

10. The position control apparatus of claim 9 wherein said gas flow chamber includes a plurality of orifices in communication with said position control chamber.

11. The position control apparatus of claim 9 wherein said outer wall is generally spherical.

12. The position control apparatus of claim 9 wherein each of said gas flow generators includes a side wall extending between said outer wall and its respective driver to define its respective gas flow chamber.

13. The position control apparatus of claim 12 wherein said at least one orifice is formed in said outer wall.

14. The position control apparatus of claim 13 wherein said at least one orifice includes a plurality of orifices formed in said outer wall and in communication with said position control chamber.

15. The position control apparatus of claim 14 wherein said outer wall is generally spherical.

16. The position control apparatus of claim 15 including at least six gas flow generators.

17. The gas flow generator of claim 1 wherein said cross-sectional area of said chamber is measured at a point spaced outwardly from said diaphragm.

18. The gas flow generator of claim 17 wherein said end wall has an area as measured in a plane parallel to said diaphragm which is about equal to or greater than that of said diaphragm.

19. The position control apparatus of claim 12 wherein said cross-sectional area of said chamber is measured at a point spaced outwardly from said diaphragm.

20. The position control apparatus of claim 19 wherein said side wall joins with said outer wall to define an end wall of said chamber and wherein said end wall has an area as measured in a plane parallel to said diaphragm which is about equal to or greater than that of said diaphragm.

21. A gas flow levitation device comprising:

an oscillatory motion driver;

a cover defining a chamber mounted adjacent to said driver, said cover having a non-planar, curved end wall spaced outwardly from said driver; and a plurality of gas flow orifices in said end wall.

22. The gas flow levitation device of claim 21 wherein said end wall has a partial spherical configuration.

* * * * *

UNITED STATES PATENT AND TRADEMARK OFFICE
CERTIFICATE OF CORRECTION

PATENT NO. : 6,561,309 B1  
DATED : May 13, 2003  
INVENTOR(S) : Rice et al.

It is certified that error appears in the above-identified patent and that said Letters Patent is hereby corrected as shown below:

<u>Column 3,</u>
Line 24, reads "diff use" should read -- diffuse --
Line 31, reads "-1000Hz" should read -- 1-1000Hz --

Signed and Sealed this

Twenty-fourth Day of February, 2004

JON W. DUDAS
*Acting Director of the United States Patent and Trademark Office*